United States Patent [19]

Kupka

[11] Patent Number: 4,781,828

[45] Date of Patent: Nov. 1, 1988

[54] FILTER PRESS WITH ROTOR DISKS

[75] Inventor: Dieter Kupka, Neu-Ulm, Fed. Rep. of Germany

[73] Assignee: Bauko Baukooperation GmbH, Salzburg, Austria

[21] Appl. No.: 943,617

[22] Filed: Dec. 18, 1986

[30] Foreign Application Priority Data

Dec. 23, 1985 [DE] Fed. Rep. of Germany ... 8560084[U]

[51] Int. Cl.$^4$ .................. B01D 25/12; B01D 25/38
[52] U.S. Cl. .................................. 210/225; 15/256.5; 15/256.52; 100/198; 100/199; 210/230; 210/231; 210/413
[58] Field of Search .............. 100/195, 196, 197, 198, 100/199; 210/224, 225, 230, 231, 407, 408, 413, 405; 15/246, 256.5, 256.52

[56] References Cited

U.S. PATENT DOCUMENTS

| 2,975,903 | 3/1961 | Ulrich | 210/236 |
| 3,117,083 | 1/1964 | Przhilensky | 210/225 |
| 4,722,789 | 2/1988 | Kupka | 210/225 |

FOREIGN PATENT DOCUMENTS

2551467 11/1975 Fed. Rep. of Germany.
2908880 3/1979 Fed. Rep. of Germany.
230613 12/1984 Japan .................... 210/225

Primary Examiner—Richard V. Fisher
Assistant Examiner—W. Gary Jones
Attorney, Agent, or Firm—Brooks Haidt Haffner & Delahunty

[57] ABSTRACT

The invention provides a novel filter press comprising a filter chamber wall adapted to be axially displaced for exposing a plurality of filter units contained in the filter press. A certain clearance is provided between the substantially circular filter units and the interior wall surface of the housing or casing, the latter being sealed only adjacent its ends in cooperation with respective end walls. The sealing surfaces are disposed at locations away from the areas coming into contact with the filtering residues on evacuation and cleaning of the filter chamber. A particularly advantageous embodiment of a rotor for a filter press of this type is composed of rotor disks each comprising two axially displaceable rigid pressure plates which are prevented from being rotated by a hub disk interposed therebetween and non-rotatably mounted on the rotor shaft. The introduction of a pressure fluid through the rotor shaft into a cavity between the two plates permits the plates to be forced apart to thereby squeeze retained liquid from the filter cakes on the adjacent filter frames (FIG. 3).

24 Claims, 8 Drawing Sheets

FILTER PRESS WITH ROTOR DISKS

The present invention relates to a filter press of the type defined in the generic clause of claim 1. A filter press of this type is the subject matter of copending U.S. patent application Ser. No. 757,006, filed July 19, 1985, now abandoned.

This filter press comprises a series of axially aligned filter units each consisting of a filter frame and, disposed in opposition thereto, a plate-shaped rotor disk mounted on and rotatable in unison with a hollow shaft extending through the filter press. The filter frame defines a cavity closed at the side opposite the rotor disk by a filter medium in the form of a perforate plate, a filter cloth or the like which may be rigidified by ribs in said cavity. The cavity is designed to receive the filtrate and communicates through a substantially radial passage with a peripheral groove formed on the filter frame. At opposite sides of the peripheral groove respective O-rings form a seal between the filter frame and the peripheral wall of a housing surrounding all filter units and formed with filtrate outlets opening to the exterior thereof. The seals are required for isolating the filtrate outlet of each filter unit from the feed liquid chamber of the adjacent filter unit. In operation, the feed liquid to be filtered is supplied to the feed liquid chambers and distributed therein by means of the rotor disks, the slow rotation of the rotor disks ensuring uniform growth of the filter cakes on the filter media. After the filter cakes have attained a sufficient thickness they are compressed with the aid of the rotor disk to be thereby drained as far as possible.

For removing the filter cakes from the filter press the peripheral housing wall is axially removed from the filter chambers so as to permit the filter cakes to be removed from the filter press in radial direction. The removal is assisted by suitably rotating the rotor disks which are provided with a sweeper rib for this purpose.

Although this filter press permits a considerably increased productivity to be achieved as compared to previuosly known chamber filter presses, particularly due to the fact that the growth of the filter cakes proceeds very uniformly and the evacuation operation can be carried out in a very short time, there are still certain shortcomings. Thus the described O-rings or seals isolating the filtrate chambers from the feed liquid chambers have to withstand a relatively high pressure differential. Furthermore the opening of the filter press entails a frictional sliding movement of the peripheral housing wall over a considerable number of such seals, which is not only harmful to the seals, but also requires a considerable force. Of particular disadvantage is the fact that on evacuation of the filter press the seals come into contact with the filter residue, requiring them to be cleaned particularly carefully at the end of the evacuation of the filter press, so that they are not damaged as the filter press housing is closed again and their proper sealing function is ensured after closing of the filter press. For the same reasons it is obvious that the peripheral housing wall likewise has to be carefully cleaned prior to being closed again. Since the sealing surfaces are within the peripheral housing wall, their inspection as to cleanliness is rather cumbersome. The particular care required during evacuation and cleaning of the filter press results in the otherwise achieved advantages being partially forfeited.

It is an object of the invention to provide a filter press of the type defined in the introduction which is capable of being rapidly evacuated, requires only a minimum of sealing provisions and renders any particular cleaning prior to reclosure of the housing dispensable.

The invention avoids the use of seals between individual filter units as well as between the latter and the movable peripheral housing wall. The feed liquid chamber of the individual filter units within the housing are thus in communication with one another, and the filtrate chambers are connected to a common pipe conduit extending through the housing. There is not any seal provided between the individual filter chambers and the slidably supported housing wall, the latter being merely sealed towards the exterior, the respective seals being readily able to be placed far away from any location which might be contaminated by filtrate residues. In any case the sealing surfaces are readily accessible for inspection as to cleanliness.

Since in the closed state of the filter housing there remains an open clearance between the individual filter units and the interior surface of the peripheral wall, any contaminations remaining on the filter units or on the adjacent interior surface of the peripheral housing wall after evacuation of the filter press will not have any prejudicial effects. The evacuation and cleaning of the filter press may thus be carried out considerably less carefully than the respective operations in the case of any known filter press.

Also described in the above cited prior U.S. patent application is a rotor the rotor disks of which carry flexible diaphragms on opposite sides cooperating with the respective rotor disk to define a plenum communicating with the bore of the hollow shaft and adapted to be supplied therethrough with a pressurized fluid effective to apply the respective diaphragm to the filter cake so as to squeeze the remaining liquid therefrom. Such diaphragms are rather fragile components and thus susceptibcle to be easily damaged. The present invention therefore also provides an improved rotor of increased strength capable of being made at reduced costs and offering the advantage of high stability.

The invention shall now be described in detail with reference to the accompanying drawings, wherein.

Figure 1A:
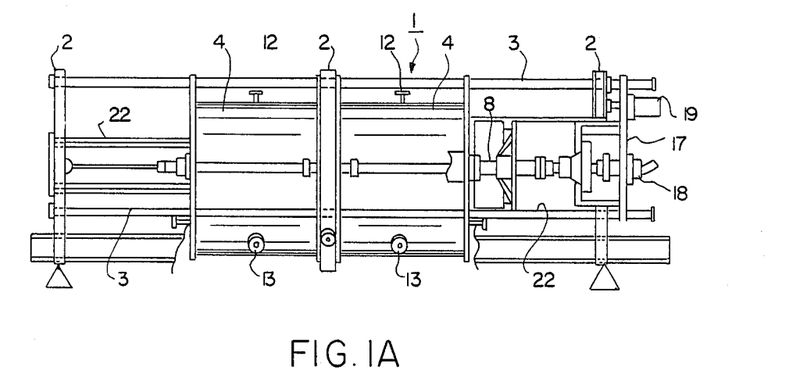
FIGS. 1A and 1B show a filter press with the characteristics of the present invention, in the closed state of the housing (A), and in the open state of the housing (B)
Figure 1B:
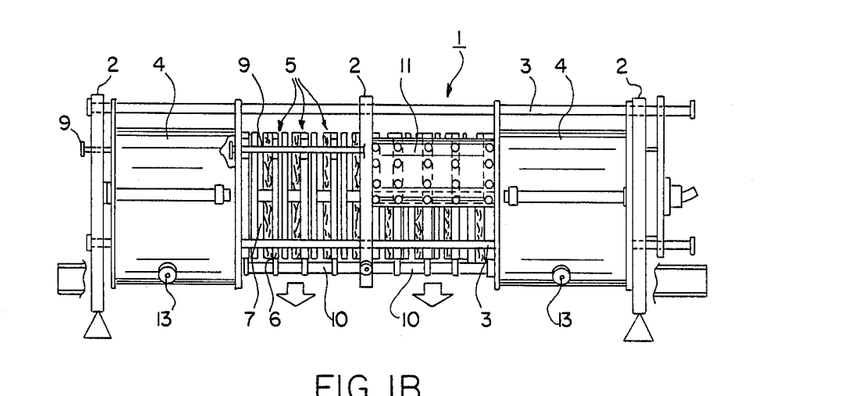

Shown in FIG. 1 is a strongly diagrammatical illustration of a tandem filter press useful for carrying out the present invention. Filter press 1 comprises a frame composed of spaced parallel support walls 2 interconnected by rails 3. Slidably mounted on rails 3 on opposite sides of central support wall 2 are two substantially cylindrical casings 4.

In their closed state casings 4 define a cavity containing a number of coaxially aligned filter units 5 each comprising a filter frame 6 and an associated rotor disk 7. Rotor disks 7 are mounted on and rotatable in unison with a common shaft 8 extending through filter press 1 over its full length. Filter frames 6 are supported by support walls 2 independently of the casing components. This is accomplished according to the invention by two different advantageous embodiments to be explained in detail hereinafter.

The upper portion of each casing 4 is formed with an opening 12 which may function as an inlet or outlet. The lower portion of each casing 4 is provided with at least one port 13 the purpose of which will be explained as the description proceeds.

Figure 2:
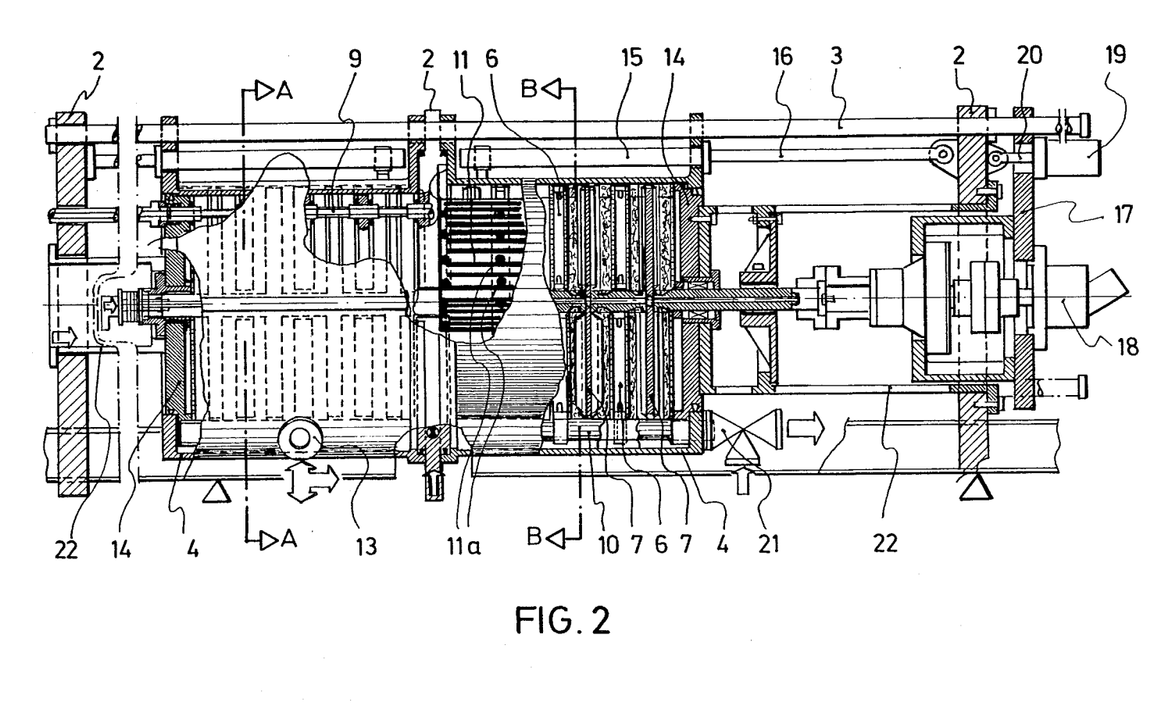
FIG. 2 shows a partially sectioned view of the filter press of FIG. 1 for explaining its operation.

The two filter chambers on the left and right sides of central support wall 2 are in practice of substantially indentical construction, although FIGS. 1(B) and 2 show two different solutions for the support of respective filter frames 6.

As shown in the sectional view of FIG. 2, the ends of each of these chambers are defined on the one hand by central support wall 2, and by an end wall 14 on the other. End walls 14 are axially connected to support walls 2 to be carried thereby. Details of this arrangement will be explained as the description proceeds. The distance between end walls 14 and outer support walls 2 corresponds to the axial length of the respective casing 4, so that axial displacement of the latter permits the associated filter chamber to be completely exposed as shown in FIG. 1(B).

Figure 4:
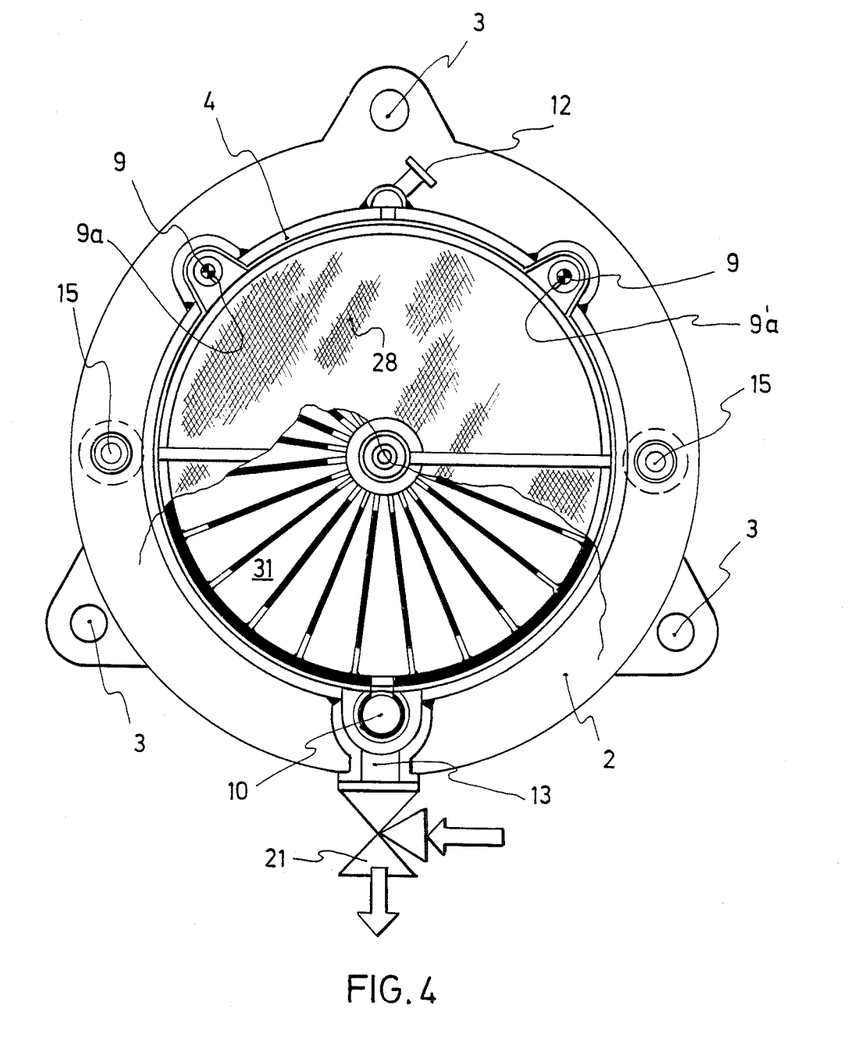
FIG. 4 shows a sectional view of a first embodiment of the filter press on an enlarged scale, taken along the line A—A in FIG. 2.

As already mentioned the support of filter frame 6 on support walls 2 may be accomplished according to two embodiments, one such embodiment being shown for the lefthand filter chamber in FIGS. 1(B) and 2, and in FIG. 4.

According to this example a pair of rods 9 extending axially through the filter chamber are secured to both support walls 2 and end walls 14 for retaining end walls 14 at fixed axial positions and for supporting filter frames 6 provided with suitable projections for this purpose. Filter frames 6 are additionally supported from below by a pipe 10 extending axially through the filter chambers and itself supported at least by central support wall 2. Rods 9 and pipe 10 are suitably disposed at uniform spacings around the periphery of filter frames 6 as shown in FIG. 5.

Figure 5:
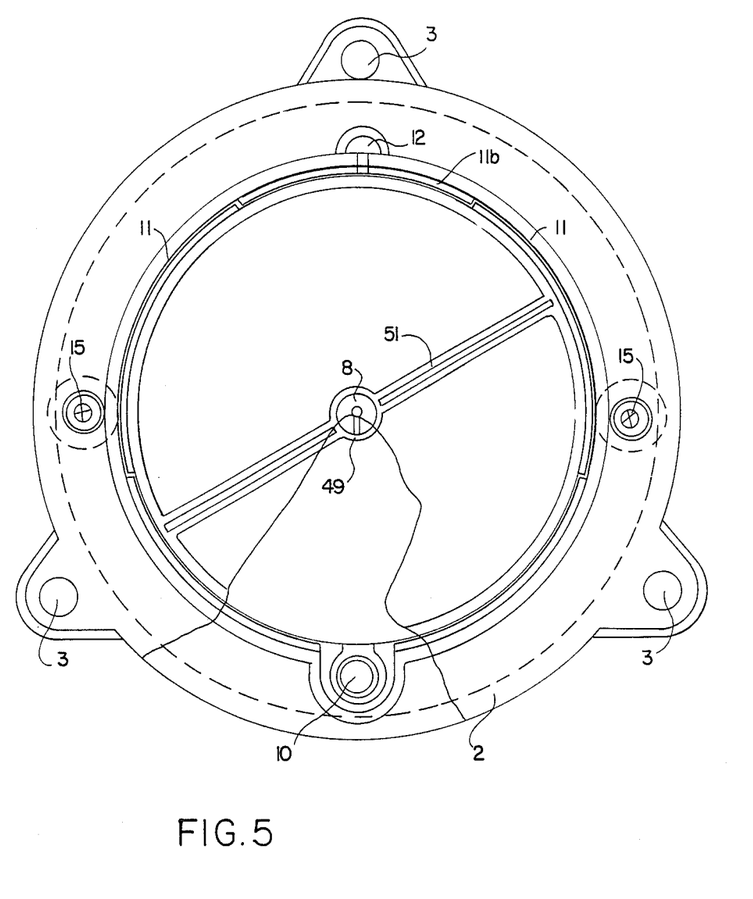
FIG. 5 shows a sectional view of a second embodiment of the filter press on an enlarged scale, taken along the line B—B in FIG. 2.

The alternative embodiment is depicted by way of example in the righthand filter chamber in FIGS. 1(B) and 2, and in FIG. 5.

According to this example end walls 14 are connected to central support wall 2 by mounting frame members 11 disposed at upper peripheral locations of filter frames 6, rods 9 being omitted. Mounting frame members 11 are of arcuate cross-sectional shape extending over a quarter of a full circle, and secured to central support wall 2 and end walls 14 at opposite sides of the top of filter frames 6 so as to cover the upper portion of the respective filter chamber down to respective points somewhat below its center level as evident from FIG. 5.

The mounting frame members are plates made of metal or plastics. Filter frames 6 have their upper portions secured to mounting frame members 11 by means of threaded bolts 11a. In addition filter frames 6 are supported from below by the already mentioned pipe 10.

While in the first embodiment described above end wall 14 is connected to outer support wall 2 not only by pipe 10, but also by rods 9, the function of rods 9 is assumed in the second embodiment by a frame 22 formed as a cage or a tubular member connecting end wall 14 to outer support wall 2 and bolted to these two components. As shown on the right in FIG. 2, cage frame 22 additionally supports a bearing for shaft 8.

The subdivision of the mounting structure in the filter chamber into a pair of mounting frame members 11 offers the advantage that maintenance operations may be facilitated by removing one of the mounting frame members, the other one continuing to support the filter frames.

For avoiding the accumulation of contaminants on support walls 2 and end walls 14 in the space between the mounting frame members, this space may be suitably filled by a strip-shaped filler body 11b (cf. FIG. 5).

Each casing 4 is axially displaceable by means of an associated hydraulic unit comprising a cylinder 15 and a piston rod 16. In the example shown, cylinder 15 is secured to casing 4, while piston rod 16 is connected to outer support wall 2.

Mounted on rails 3 for axial displacement is a mounting plate 17 carrying a drive unit 18 for the rotation of shaft 8. Mounting plate 17 is connected to outer support wall 2 by a hydraulic unit comprising a cylinder 19 and a piston rod 20 as shown to the right in FIG. 2. Cylinder 19 is secured to mounting plate 17, while piston rod 20 is connected to righthand outer support wall 2. The hydraulic unit 19, 20 is operable to axially displace mounting plate 17 in unison with drive unit 18 and shaft 8 for a corresponding displacement of rotor disks 7.

As shown in FIG. 2, rods 9 may be formed as tubular members provided with openings 9a in the space between rotor disks 7 and filter frames 6, so that they may serve as supply conduits for the feed liquid to be filtered, for flushing water, pressurized air or the like.

Figure 3:
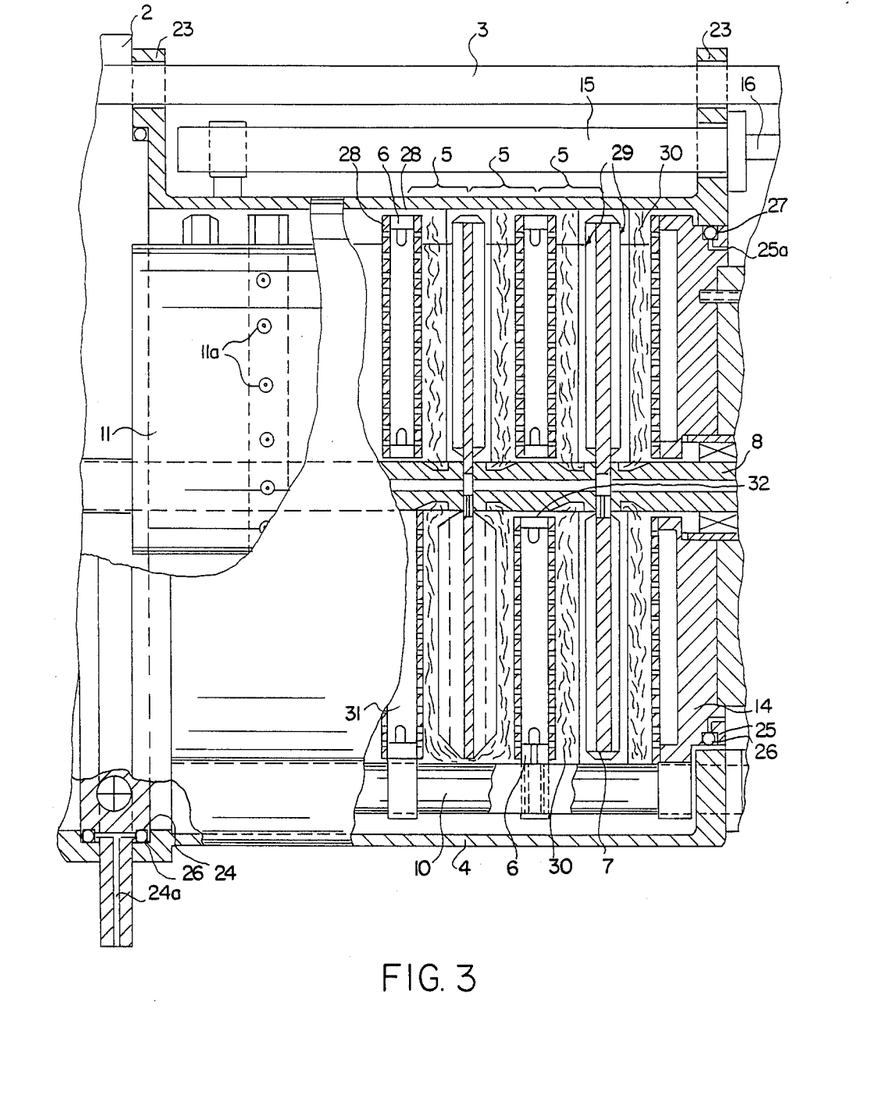
FIG. 3 shows a detail of FIG. 2 on enlarged scale.

The construction of one of the filter chambers is more clearly evident from FIG. 3. The ends of the filter chamber are defined by central support wall 2 on the one hand, and by end wall 14 on the other. In the radial direction the filter chamber is enclosed by the substantially tubular casing 4 supported on guide rails 3 by carrier lugs 23 formed with suitable openings therethrough. The drawing shows only one of the guide rails 3, it being understood, however, that there is a plurality of such guide rails, preferably three guide rails disposed at equal angular spacings about the filter press.

Central support wall 2 and end wall 4 are each formed with a peripherally extending annular groove 24 and 25, respectively, with a sealing O-ring 26 disposed therein. The ends of casing 4 are provided with machined sealing surfaces 27 cooperating with O-rings 26. As clearly evident from FIG. 3, O-rings 26 and sealing surfaces 27 are disposed substantially beyond the range of the filter chamber in its opened state.

Annular grooves 24 and 25 preferably have a dovetail cross-section converging towards their open side, and O-rings 26 are in engagement with their sidewalls. O-rings 26 cooperate with the sidewalls and the bottom wall of each annular groove 24 and 25, respectively, to define a chamber provided with a connecting passage 24a and 25a, respectively, opening towards the exterior for the supply of a pressurized fluid, in particular pressurized air, to the respective chamber. As a result of this construction the sealing surfaces on casings 4 on the one hand and on central support wall 2 and end wall 14 on the other need not be accurately machined to a tight fit. There may even be a certain clearance between these surfaces, so that the seals are not subjected to any friction on closing and opening the filter chamber. The sealing function is established by supplying the respective chambers with pressurized air effective to sealingly engage O-rings 26 with the sealing surfaces of casing 4. Alternatively the sealing rings 26 may be formed as inflatable gaskets adapted to be inflated by pressurized air or the like.

As shown in FIG. 3, each filter unit 5 comprises a filter frame 6 and a rotor disk 7. In the example shown, each of these units is of symmetric construction, i.e. each filter frame 6 carries a filter medium 28 on both sides, for instance in the form of a perforate plate or a cloth, and each rotor disk 7 is provided with pressure plates 29 on opposite sides. The filter cake accumulating between filter media 28 and pressure plates 29 is designated by the numeral 30 in FIG. 3. The filtrate chambers 31 defined between filter media 28 are in communication with pipe 10 as shown in the lower portion of FIG. 3. The rotor disks are hollow, their interior being in communication with the bore of hollow shaft 8. This aspect will be discussed in detail as the description proceeds. Pipe 10 serves mainly as an outlet pipe and is provided with a three-way valve 21 by way of which the filtrate may be discharged, and additionally offering the possibility of a backflow flushing operation with the aid of a flushing liquid.

In the embodiment shown by way of example, pipe 10 at one end of the filter press extends through respective end wall 14 towards the three-way valve disposed therebeyond. It may also be advantageous to provide a connection to pipe 10 within central support wall 2, in which case the pipe needs not extend through the respective end wall, so that both filter chambers to the right and to the left of central support wall 2 may be of identical construction.

As further evident from FIG. 3, there are no seals between filter frames 6 and shaft 8, there being even a gap 32 in this area. In the same manner there are no seals provided between rotor disks 7 and filter frames 6 on the one hand and the wall of casing 4 on the other. Also at these locations there is at least formed a respective gap 33 apart from the wider clearance adjacent outlet pipe 10 as shown in FIG. 3, below. As soon as casing 4 has been axially withdrawn from O-rings 26 on central support wall 2 and wall 14, or as soon as the sealing pressure has been relieved by venting the respective seal chambers, casing 4 is thus able to slide freely over the rotor disks and filter frames without being hampered by any contaminations possibly accumulated in the gaps therebetween.

Figure 6:
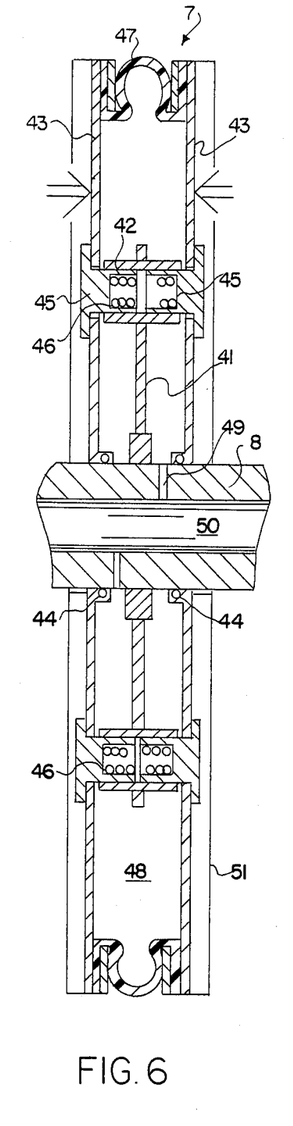
FIG. 6 shows a longitudinal sectional view of a rotor disk.

A preferred construction of a rotor disk is shown in FIG. 6. The disk comprises a hub disk 41 fixedly secured to hollow shaft 8 as by being welded thereto or by means of a wedge. Hub disk 41 carries a number of guide bushings 42 extending parallel to shaft 8 and welded to hub disk 41 at excentric positions. Rotor disk 7 further comprises two rigid circular plates 43 located at opposite sides of hub disk 41 and forming the pressure faces of the rotor disk. Plates 43 are guided on shaft 8 for axial displacement, and sealed on the shaft by means of respective O-ring seals 44 seated in corresponding annular grooves of the plates.

Plates 43 are prevented from rotating relative to shaft 8 by tubular guide studs 45 inserted into guide bushings 42 through corresponding bores in plates 43.

As will be explained later on, the two plates 43 of each rotor disk 7 are pulled towards one another by tension springs 46. Along their outer periphery the two plates 43 are connected to one another by a flexible annular seal 47 of substantially U- or Ω-shaped cross section, the outer legs of seal 47 being secured to the inner surfaces of plates 43. The cavity defined by plates 43, seal 47 and shaft 8 communicates with the axial bore 50 of shaft 8 through at least one bore 49 formed in shaft 8. The distance between the two plates 43 may thus be increased against the force of springs 46 by supporting a pressurized fluid to cavity 48 through hollow shaft 8 and radial bore 49.

The outer side of each plate 43 forming the pressure face thereof is provided with at least one axially projecting rib 51 extending from the inner edge to the outer edge of the plate 43.

Figure 7:
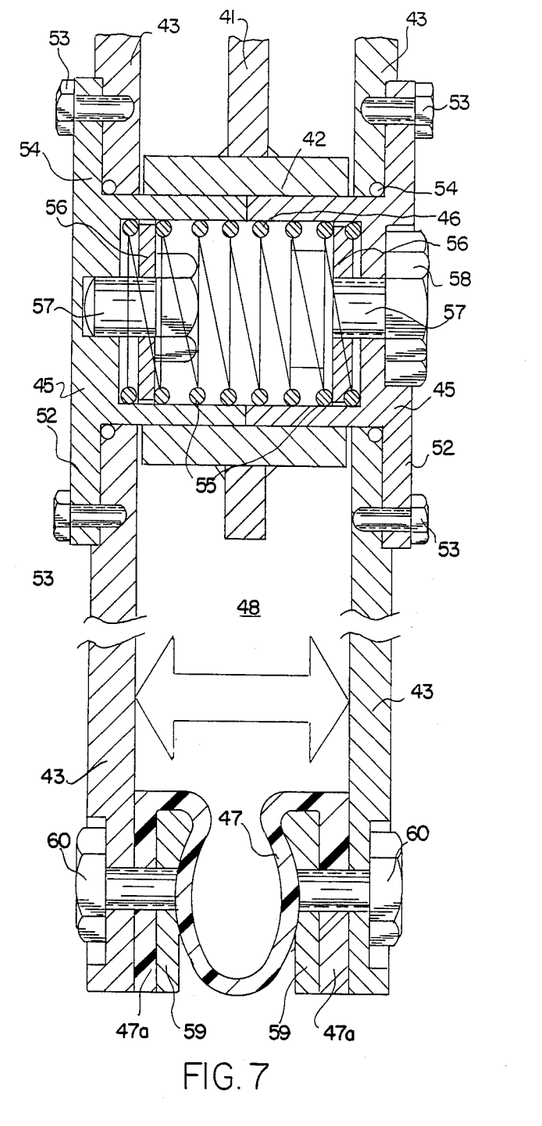
FIG. 7 shows a detail of FIG. 6 on an enlarged scale.

Depicted in FIG. 7 are details of the construction shown in FIG. 6. The guide studs 45 securing plates 43 non-rotatably to guide bushing 42 and thus hub disk 41 have their outer ends formed with an annular flange 52 secured to the respective plate 43 by means of bolts 53. An O-ring seal 54 seated in the hollow between annular flange 52 and the cylindrical portion 55 of guide stud 45 seals cavity 48 toward the exterior. Tension spring 46 is housed in the space enclosed by the two guide studs 45 and has one of its ends secured to flange 52 of one guide stud by means of a washer 56 and a bolt 57. The other end of spring 46 is secured by means of a similar washer 56, a bolt 57 and a nut 58 threaded onto the projecting outer end of bolt 57 to permit the tension of spring 46 to be suitably adjusted. At both sides of its U-shaped cross-section, seal 47 is formed with outer legs 47a extending generally parallel to the legs of the U-shaped main portion an sealingly clamped between a ring 49 and the interior surface of the respective pressure plate 43. Supply of a pressurized fluid to cavity 48 causes the two pressure plates 43 to be displaced away from one another as shown by arrow A, this displacement being accommodated by a corresponding unfolding of U-section seal 47. When the pressure thus applied to cavity 48 is relieved, tension springs 46 act to pull the two plates towards one another into engagement with the end faces of guide bushings 42.

Figure 8:
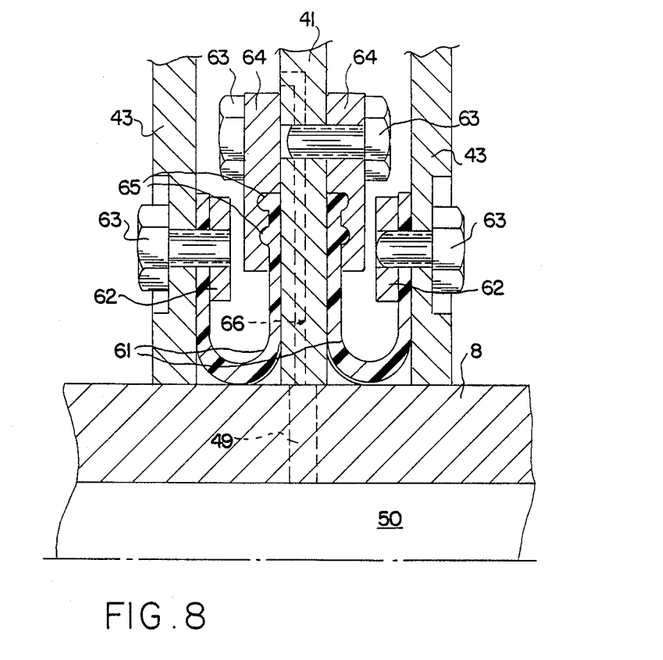
FIG. 8 shows an embodiment of a rotor disk sealing arrangement adjacent the rotor shaft.

While FIG. 6 shows an embodiment in which the cavity 48 between plates 43 is sealed on the shaft side by O-rings 44 disposed between plates 43 and shaft 8, FIG. 8 shows an embodiment in which the seal on the shaft side is accomplished by means of an arrangement corresponding to that of the outer peripheral seal 47 shown in FIG. 7. In this embodiment a resilient seal ring 61 of U-shaped cross-section is disposed between hub disk 41 and each plate 43, the legs of seal ring 61 being respectively clamped to the corresponding pressure plate 43 by means of an annular washer 62 and the bolts 63 passing through plate 43, and to hub disk 41 by means of suitable annular washers 64 and bolts 63. Annular beads 65 and complementary annular recesses in washers 64 may be provided for facilitating assembly and improving the sealing function. An arrangement of this type is particularly advantageous, as it is substantially unaffected by contaminations of the shaft. Communication between the bore 50 of shaft 8 and cavity 48 between pressure plates 43 is established in this embodiment by the already mentioned radial bore 49 in the wall of shaft 8 and an aligned bore 66 in hub disk 41.

The material for seals 47 and 61 of U-shaped cross-section is preferably selected from fabric-reinforced rubber or plastics materials. Suitably dimensioned seals of these materials are fully capable of withstanding operating pressures of a magnitude up to 20 bar without loosing their flexibility or being otherwise affected. The actual selection of the material obviously also depends on the type of the feed liquid to be processed, as these seals are directly exposed to the influence of the feed liquid.

Figure 9:
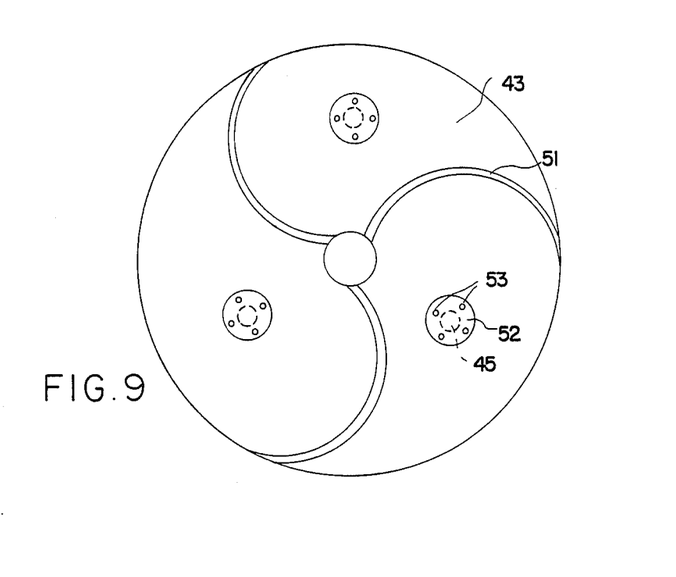
FIG. 9 shows a plan view of a rotor disk.

FIG. 9 shows a plan view of a rotor disk, in particular a pressure plate 43 with three uniformly spaced guide studs 45 having their annular flanges 52 secured to plate 43 by means of bolts 53. Plate 43 carries three ribs 51 extending from its center portion towards its periphery at equal angular spacings. Rib 51 are of arcuate shape, so that counterclockwise rotation of the rotor disk results in an outwards directed stripping action of the ribs. In practice ribs 51 may have a height of about 10 mm, which is sufficient to strip the filtering residues from the filter medium of the respective filter unit. On discharge of the pressurized fluid from the cavity of the rotor disk 7, the tension springs (not shown in FIG. 9) contained in guide studs 45 exert a uniform traction force on pressure plates 43 to thereby return them to their rest position.

Figure 10:
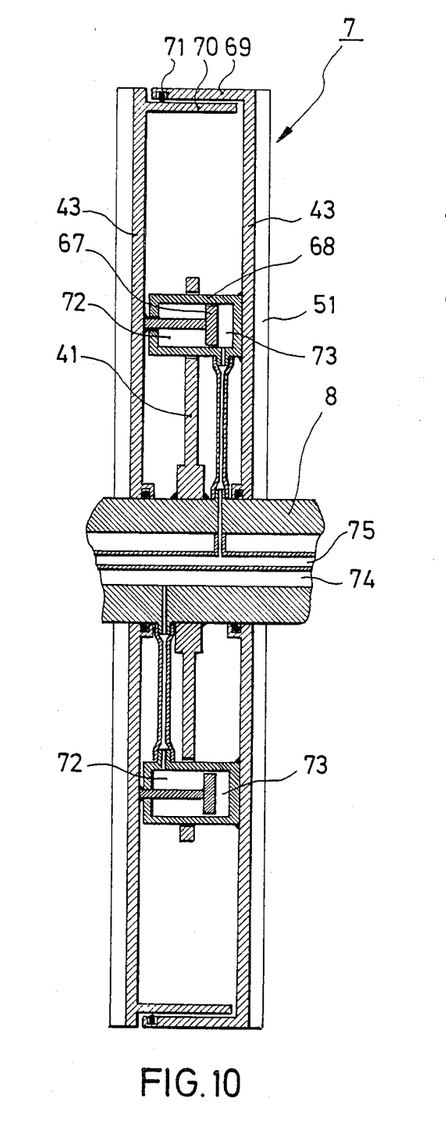
FIG. 10 shows a longitudinal sectional view of another embodiment of a rotor disk.

In another embodiment shown in FIG. 10, a rotor disk 7 comprises a hub disk 41 fixedly secured to the hollow shaft 8 in the general manner of hub disk 41 shown in FIG. 6. Instead of guide bushings the hub disk 41 carries hydraulic or pneumatic piston/cylinder units 67, 68 mounted on the hub disk 41 in a floating manner. Disposed on opposite sides of the hub disk 41 are rigid circular plates 43 corresponding to the pressure plates 43 shown in FIG. 6. The piston/cylinder units have their pistons 67 each connected to one of the plates, whereas their cylinders 68 each are connected to the other of said plates. These connections are shown in the drawing by welding seams. Since the piston/cylinder units transmit the rotation of the hub disk to the plates, they have to be sufficiently stiff in the direction perpendicular to their longitudinal axes. Along their peripheries the plates are provided with axially projecting rim portions 69, 70 engaging one another and being sealed by an O-ring seal 71 disposed in a groove near the edge of the inner surface of the outer rim 69 portion 69. Alternatively, an outer seal means as shown in FIG. 7 may be used, in this case requiring low pressure resistance only.

The piston/cylinder units 67, 68 are preferably of the double-acting type provided on opposite sides of their pistons 67 with separate cylinder chambers 72, 73 adapted to have pressure fluid alternately supplied thereto. Supply of the pressure fluid to one (72) of these chambers will be effective to move the plates 43 away from one another, while pressurization of the other chambers 73 will cause the plates 43 to move towards one another. This arrangement requires two fluid passages 74, 75 extending along or within the shaft 8, or to employ a valve mechanism (not shown) within the space defined by the plates 43 for alternately directing the pressure fluid to respective cylinder chambers 72 and 73.

Figure 11:
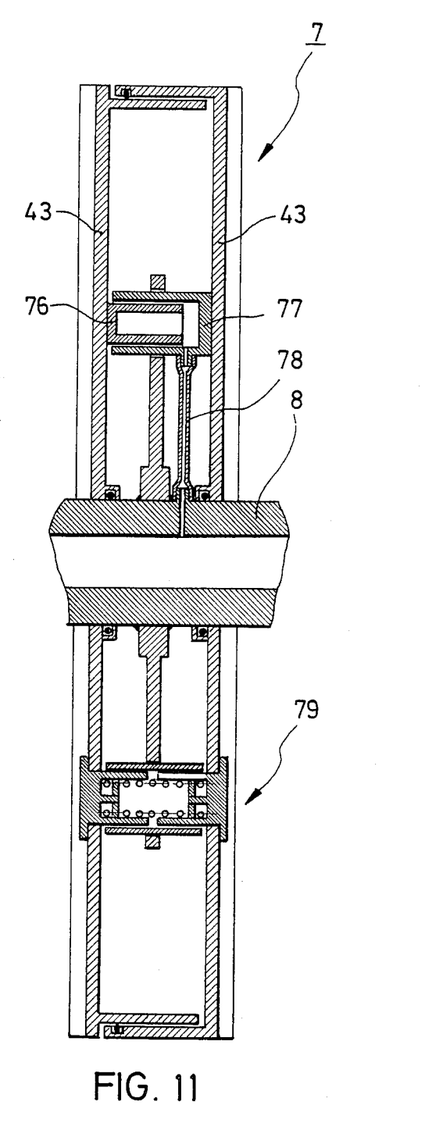
FIG. 11 shows a longitudinal sectional view of another preferred embodiment of a rotor disk.

FIG. 11 shows another embodiment employing single-acting piston/cylinder units 76, 77 one being shown, in combination with suitable spring means 79 of the types as shown in detail in FIG. 7 for returning the plates to their rest position, the cylinder chambers of said piston/cylinder units being connected to the interior of the hollow shaft 8 by a conduit 78. Alternatively the plate 43 might be caused to move towards one another by applying a vacuum to the cylinder chambers of the single-acting piston/cylinder units 76, 77. In each case it is understood that suitable rotary coulpling means (not shown) are provided at the end of shaft 8 for the supply and return of the actuating fluid.

The filter press according to the invention operates as follows: Preparatory to the filtering process the filter chambers are closed by advancing casings 4 into engagement with central support wall 2. Subsequently the filter chambers are continuously supplied with the feed liquid to be filtered through ports 13 so as to be completely filled with the feed liquid. Gaseous or volatile components possibly entrained by the feed liquid are permitted to escape through openings 12. The filtrate passes through the filter media 28 into the filtrate chambers therebeyond and is drained therefrom through discharge pipe 10. During the supply of the feed liquid, shaft 8 is slowly rotated by the action of drive mechanism 18. The rotation of shaft 8 may be periodically reversed, so that the feed liquid in the filter chamber is continuously agitated to thereby prevent the filter media 28 from being prematurely clogged and to ensure uniform precipitation of the filter residues as the filtering cycle proceeds. At the same time hydraulic unit 19, 20 may be operated for causing shaft 8 to reciprocate, preferably with a gradually diminishing amplitude, for uniformly kneading or squeezing the filter residues as they accumulate on the filter media. After a suitable amount of the filter residues has accumulated on the filter media, the supply of feed liquid is discontinued and shaft 8 stopped. Subsequently a pressure fluid such as water or hydraulic oil is supplied to rotor disks 7 through shaft 8 to force pressure plates 43 apart against the force of springs 46 and into pressure engagement with the filter cakes formed on the filter media, so that a major proportion of liquid retained therein is squeezed out. The feed liquid remaining in the filter chamber is drained through port 13 for further processing in a subsequent filtering cycle.

After the pressure fluid has subsequently been drained from rotor disks 7, pressurized air may be injected into the filter chambers through tubular rods 9, if so desired, for further drying the filter cakes. At the same time the pressurized air is effective to force any sludge remaining in the filter chambers through ports 13 to thereby avoid that on evacuation and cleaning of the filter chambers the dry filter cakes come into contact with the wet material.

Subsequently the filter chambers are opened by axial displacement of casings 4. The space below filter units 5 is then completely open, and the filter cakes may be stripped off the filter media 28 by renewed rotation of shaft 8 and engagement of pressure plates 43 with the filter cakes. To this purpose rotor disks 7 may be spread apart in the manner described above, or hydraulic unit 19, 20 may be operated to reciprocate shaft 8.

As already mentioned, three-way valve 21 may subsequently operated to supply a flushing liquid to filtrate chambers 31 of the filter frames to thereby clean the filter media by a backflow flushing operation. The flushing operation may selectively be carried out in the open or closed state of the casings.

It is also possible and advantageous to flush the filter chamber by spraying it with a cleaning liquid. In the preferred embodiment this liquid may advantageously be supplied through the tubular rods 9 provided to this purpose, as already mentioned, with openings or nozzles 9a opening into the feed liquid chambers. A flushing liquid may also be supplied via ports 13.

As already mentioned, the filter cakes are able to freely drop from the filter chamber during the stripping operation without coming into contact with any seals of sealing surfaces. As a result these sealing surface remain clean or require only a minimum amount of cleaning, so that the operating speed of the filter press is corresondingly increased and the useful lifetime of the seals is extended.

As evident from the preceding description, a filter chamber containing a plurality of filter units requires no more that two housing seals between respective ends of the casing and the end walls of the filter chamber for reliably sealing the latter. This results in a considerable simplification of the construction of the filter press and its maintenance. The clearings between the filter units and the casing wall render the complete cleaning of the filter chamber after its evacuation superfluous, since the operation of the filter press is not affected by residual contaminations.

I claim:

1. A filter press comprising a housing provided with a feed liquid inlet and consisting of two support walls and a casing defining an interior cavity of substantially circular cross section, one of said support walls forming an end closure of said cavity and the other support wall supporting an end wall forming another end closure of said cavity, said casing being in sealing engagement with said first named support wall and said end wall, further comprising a plurality of filter units coaxially aligned within said housing and composed each of a filter frame mounted in a mounting structure supported by said support walls independently of said casing, each of said filter frames defining a filtrate chamber covered in a radial plane by a filter medium, a feed liquid chamber being formed between said filter medium and a rotor disk disposed opposite thereto, said rotor disk being fixedly mounted on a hollow shaft which is rotatably supported by said support walls and extends centrally through said housing, and including means for moving the surface of said rotor disk towards said filter medium, and further comprising means for axially displacing said casing with respect to said support walls and said end wall to thereby expose said filter units wherein all position of said casing an annular clearance is existant between said filter units and said casing, said clearance being in continuous communication with all of said feed liquid chambers, said filtrate chambers being in communication with a discharge pipe extending through the interior of the filter press in parallel to said hollow shaft.

2. A filter press according to claim 1 wherein said hollow shaft is axially displaceable with respect to said support walls and said end wall.

3. A filter press according to claims 1 or 2 wherein the axis of said housing extends in a horizontal plane.

4. A filter press according to claim 3 wherein said casing is provided with at least one port at its lower portion.

5. A filter according to claim 1 or 2 wherein said support wall forming a housing end closure and said end wall are formed with peripheral grooves accomodating a respective O-ring seal.

6. A filter according to claim 5 wherein said peripheral grooves are of a cross-sectional dovetail configuration converging towards its open side, and connected to conduit means for the supply of a pressure fluid, a narrow annular clearance being formed between sealing surfaces of said casing and the peripheral surfaces formed with said peripheral grooves, said clearance being sealed upon supply of said pressure fluid.

7. A filter press according to claim 1 or 2 wherein said support wall acting as said housing end closure is provided with an interior outlet passage communicating with said discharge pipe.

8. A filter press according to claim 1 or 2 wherein said end wall is supported by said support walls by means of rods which extend parallel to the axis of rotation of said rotor, said rods simultaneously acting to support said filter frames within said filtrate chamber.

9. A filter press according to claim 8 wherein rods are hollow and formed with outlets opening into said feed liquid chamber between the filter frames.

10. A filter press according to claim 1 or 2 wherein said end wall is supported within said filtrate chamber on said support wall forming said housing end closure by means of mounting frame members of part-circular cross-sectional shape which extend between said end closures, simultaneously acting to support said filter frames, and on said other support wall by means of a cage frame member.

11. A rotor for a filter press, said rotor comprising a hollow shaft to extend through said filter press and having a central bore and a plurality of rotor disks fixedly mounted in said shaft at axial spacings, each rotor disk comprising a hub fixedly mounted on said shaft and two symmetrically disposed rigid pressure plates forming axially displaceable surface elements arranged on said shaft on opposite sides of said hub disk for axial displacement and being biased towards on another by means engaging said pressure plates, means defining at least one variable-volume cavity communicating with the bore of said hollow shaft and being disposed between said pressure plates to urge them from one another upon supply of a pressurized fluid to said cavity so as to force said pressure plates into engagement with filter cakes accumulating on filter media of adjacent filter units disposed adjacent to said rotor disks within said filter press, and further comprising sealing means being provided for defining said cavity in cooperation with said two pressure plates.

12. A rotor disk according to claim 11 wherein a plurality of axially extending guide bushings are secured to said hub disk at excentric positions and in a concentric circular arrangement for engagement by guide studs secured to said plates.

13. A rotor according to claim 12 wherein each guide stud comprises a guide sleeve portion extending through a bore in the respective plate, and an annular flange at the outer end of said sleeve member sealingly secured to the respective plate.

14. A rotor according to claim 13 wherein each pair of cooperating guide sleeve members encloses a coiled tension spring secured to said guide sleeve members adjacent respective ends thereof.

15. A rotor according to claim 14 wherein an adjustment nut is provided for securing said tension spring adjacent one of its ends.

16. A rotor according to claim 11 wherein two plates of each rotor disk are interconnected along their periphery by means of a flexible sealing gasket of generally U-shaped cross-sectional configuration.

17. A rotor according to claim 16 wherein the space defined by the pair of plate of each rotor disk is in fluid communication with the bore of said hollow shaft by means of a respective bore provided in the wall of said hollow shaft.

18. A rotor according to claim 11 wherein the disks each are provided at the peripheral edge thereof with a rim, the rims of one pair of plates telescopingly sliding into each other and having a sliding seal therebetween.

19. A rotor according to claim 18, wherein the space defined by the pair of plates of each rotor disk is in fluid communication with the bore of said hollow shaft by means of a respective bore provided in the wall of said hollow shaft.

20. A rotor according to claim 11 wherein the two plates of any rotor disk are sealingly supported on said hollow shaft with the aid of O-ring seals.

21. A rotor according to claim 11 wherein a plurality of hydraulic or pneumatic piston/cylinder units are mounted on said hub disk in an axially floating manner and at circumferentially fixed positions with respect to said hollow shaft, the pistons of said units engaging one of said pressure plates and the cylinders thereof engaging the other of the pressure plates in each rotor disk, each piston/cylinder unit communicating with at least one conduit extending along or in said hollow shaft for the controlled supply of a pressure fluid.

22. A rotor according to claim 21 wherein each of said piston/cylinder units comprises two chambers separated from each other by the piston, the piston being fixedly secured to one of said pressure plates and the cylinder being fixedly secured to the other of said pressure plates, said units each being provided with means for supplying and discharging a pressure fluid to said chambers so as to move said pressure plate from each other and toward each other respectively.

23. A rotor according to any one of claims 11-22 wherein the plates each are provided with at least one axially projecting rib extending from its inner to its peripheral edge.

24. A filter press comprising a housing provided with a feed liquid inlet and consisting of at least two support walls and a casing defining an interior cavity of substantially circular cross section, one of said support walls forming an end closure of said cavity and the other support wall supporting an end wall forming another end closure of said cavity, said casing being in sealing engagement with said first named support wall and said end wall, further comprising a plurality of filter units coaxially aligned within said housing and composed each of a filter frame mounted in a mounting structure supported by said support walls independently of said casing, each of said filter frames defining a filtrate chamber covered in a radial plane by a filter medium, a feed liquid chamber being formed between said filter medium and a rotor disk disposed opposite thereto, said rotor disk being fixedly mounted on a hollow shaft which is rotatably supported by said support walls and extends centrally through said housing, and including means for moving the surface of said rotor disk towards said filter medium, and further comprising means for axially displacing said casing with respect to said support walls and said end wall to thereby expose said filter units wherein in all positions of said casing an annular clearance is existant between said filter units and said casing, said clearance being in continuous communication with all of said feed liquid chambers, said filtrate chambers being in communication with a discharge pipe extending through the interior of the filter press in parallel to said hollow shaft.

* * * * *

UNITED STATES PATENT AND TRADEMARK OFFICE
CERTIFICATE OF CORRECTION

PATENT NO. : U.S. Patent 4,781,828
DATED : November 1, 1988
INVENTOR(S) : Dieter Kupka It is certified that error appears in the above-identified patent and that said Letters Patent is hereby corrected as shown below:

Column 6, line 17,
    last word "supporting" should read --supplying--.

Column 6, line 41,
    "an sealingly" should read: --and sealingly--.

Column 7, line 20,
    "Rib 51" should read" --Ribs 51--.

Column 8, line 10,
    last word "coulpling" should read: --coupling--.

Column 9, line 10,
    last word "of" should read" --or--.

line 52, "all position" should read -- all positions --.
Column 10, line 40, "towards on" should read -- towards one --.

Signed and Sealed this

Eleventh Day of April, 1989

Attest:

DONALD J. QUIGG

Attesting Officer

Commissioner of Patents and Trademarks